US012595836B2

(12) United States Patent
Hagihara

(10) Patent No.: US 12,595,836 B2
(45) Date of Patent: Apr. 7, 2026

(54) POWER TRANSMISSION DEVICE

(71) Applicant: EXEDY Corporation, Neyagawa (JP)

(72) Inventor: Yoshiyuki Hagihara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 391 days.

(21) Appl. No.: 18/336,763

(22) Filed: Jun. 16, 2023

(65) Prior Publication Data

US 2024/0026950 A1 Jan. 25, 2024

(30) Foreign Application Priority Data

Jul. 20, 2022 (JP) ................................. 2022-115821

(51) Int. Cl.
*F16F 15/129* (2006.01)
(52) U.S. Cl.
CPC ............................... *F16F 15/1297* (2013.01)
(58) Field of Classification Search
CPC .. F16F 15/129; F16F 15/1292; F16F 15/1295; F16F 15/1297; F16F 15/139; F16F 15/1392; F16F 15/1395; F16F 15/1397
USPC .............................................. 464/68.4, 68.41
See application file for complete search history.

(56) References Cited

U.S. PATENT DOCUMENTS 4,351,168 A * 9/1982 Prince ............... F16F 15/12326
464/68.92
4,813,524 A * 3/1989 Reik ..................... F16F 15/139
464/68.3

4,941,860 A * 7/1990 Graton ................... F16F 15/129
464/68.4
5,649,864 A * 7/1997 Rohrle ................... F16F 15/139
464/68.3
5,704,839 A * 1/1998 Michael ................ F16F 15/129
464/89
7,134,963 B2 * 11/2006 Tsuruta ................. F16F 15/139
464/68.41
8,939,843 B2 * 1/2015 Copeland ............ F16F 15/1297
464/68.41

FOREIGN PATENT DOCUMENTS

DE 3516291 A1 * 11/1986 ........... F16F 15/139
DE 8718035 U1 * 1/1993 ........... F16F 15/139
DE 3448608 B4 * 11/2006 ........... F16F 15/139
FR 2646482 A1 * 11/1990 ........... F16F 15/129
JP 2011226572 A 11/2011

* cited by examiner

*Primary Examiner* — Josh Skroupa
(74) *Attorney, Agent, or Firm* — United IP Counselors, LLC

(57) ABSTRACT

A power transmission device includes a flywheel with increased inertia and a damper device. The flywheel includes a body portion, an attachment portion, and a first protruding portion. The attachment portion is disposed radially outward with respect to the body portion. The first protruding portion is disposed radially outward with respect to the attachment portion. The first protruding portion protrudes toward a first axial side with respect to the attachment portion. The damper device is disposed on the first axial side with respect to the body portion. The damper device is attached to the attachment portion.

10 Claims, 8 Drawing Sheets

SECOND AXIAL SIDE | AXIAL DIRECTION | FIRST AXIAL SIDE

SECOND AXIAL SIDE ← AXIAL DIRECTION → FIRST AXIAL SIDE

SECOND AXIAL SIDE ← AXIAL DIRECTION → FIRST AXIAL SIDE

SECOND
AXIAL SIDE          AXIAL DIRECTION          FIRST
AXIAL SIDE

SECOND
AXIAL SIDE

AXIAL DIRECTION

FIRST
AXIAL SIDE

POWER TRANSMISSION DEVICE

CROSS-REFERENCE TO RELATED APPLICATIONS

This application is based on and claims the priority benefit of Japanese application 2022-115821 filed Jul. 20, 2022, the contents of which are incorporated herein by reference.

BACKGROUND OF THE INVENTION

Field of the Invention

The present invention relates to a power transmission device.

Description of the Related Art

Power transmission devices are configured to absorb torque fluctuation of an engine. The power transmission devices include a flywheel and a damper device.
Patent Literature 1: JP 2011-226572A

SUMMARY OF THE INVENTION

In order to absorb a torque fluctuation more effectively, an inertia amount of a flywheel is required to be increased. In view of this, an aim of the present invention is to provide a power transmission device capable of increasing an inertia amount of a flywheel.

A power transmission device according to a first aspect includes a flywheel and a damper device. The flywheel includes a body portion, an attachment portion, and a first protruding portion. The attachment portion is disposed radially outward with respect to the body portion. The first protruding portion is disposed radially outward with respect to the attachment portion. The first protruding portion protrudes toward a first axial side with respect to the attachment portion. The damper device is disposed on the first axial side with respect to the body portion. The damper device is attached to the attachment portion.

With this configuration, since the flywheel includes the first protruding portion that protrudes toward the first axial side and is disposed radially outward with respect to the attachment portion to which the damper device is attached, the inertia amount can be increased.

A power transmission device according to a second aspect is the power transmission device according to the first aspect that employs the following configuration. The first protruding portion has an annular shape extending in a circumferential direction.

A power transmission device according to a third aspect is the power transmission device according to the second aspect that employs the following configuration. An outer diameter of the first protruding portion decreases toward the first axial side.

A power transmission device according to a fourth aspect is the power transmission device according to any one of the first to third aspects that employs the following configuration. A thickness of the first protruding portion decreases toward the first axial side.

A power transmission device according to a fifth aspect is the power transmission device according to the second or third aspect that employs the following configuration. The first protruding portion has a first inner circumferential surface and a second inner circumferential surface. The second inner circumferential surface is disposed on a second axial side with respect to the first inner circumferential surface. The second inner circumferential surface has a smaller inner diameter than an inner diameter of the first inner circumferential surface.

A power transmission device according to a sixth aspect is the power transmission device according to any one of the first to fifth aspects that employs the following configuration. The attachment portion protrudes toward the first axial side with respect to the body portion.

A power transmission device according to a seventh aspect is the power transmission device according to any one of the first to sixth aspects that employs the following configuration. The attachment portion includes an attachment surface and a groove portion. The attachment surface faces toward the first axial side. The groove portion is formed at an outer circumferential end portion of the attachment surface. The groove portion extends in the circumferential direction.

A power transmission device according to an eighth aspect is the power transmission device according to any one of the first to seventh aspects that employs the following configuration. The flywheel includes a second protruding portion. The second protruding portion is disposed radially outward with respect to the attachment portion. The second protruding portion protrudes toward the second axial side with respect to the attachment portion.

A power transmission device according to a ninth aspect is the power transmission device according to any one of the first to eighth aspects that employs the following configuration. The damper device includes a damper unit and a torque limiter unit. The damper unit is configured to absorb torque fluctuation. The torque limiter unit is configured to restrict transmission of torque with a predetermined value or more. The torque limiter unit is disposed radially outward with respect to the damper unit. The torque limiter unit is attached to the attachment portion.

A power transmission device according to a tenth aspect is the power transmission device according to the ninth aspect that employs the following configuration. The damper unit includes a first input plate, a second input plate, a first fastening portion, an output plate, and an elastic member. The second input plate is disposed on the second axial side with respect to the first input plate. The second input plate is configured to rotate integrally with the first input plate. The first fastening portion fastens the first input plate to the second input plate. The elastic member elastically connects the output plate to the first and second input plates. The first fastening portion overlaps the torque limiter unit as seen in the axial direction.

A power transmission device according to an eleventh aspect is the power transmission device according to the tenth aspect that employs the following configuration. The torque limiter unit includes a friction plate and a second fastening portion. The second fastening portion fastens the friction plate to the first input plate or the second input plate. The second fastening portion is disposed radially inward with respect to the first fastening portion.

A power transmission device according to a twelfth aspect is the power transmission device according to the tenth or eleventh aspect that employs the following configuration. The torque limiter unit includes a first side plate, a second side plate, a friction plate, and a first friction member. The first side plate has an annular shape. The second side plate is disposed on the second axial side with respect to the first side plate. The second side plate has an annular shape. The friction plate is configured to rotate integrally with the first and second input plates. The first friction member is disposed between the friction plate and the first side plate. A leading end surface of the first protruding portion is located on the first axial side with respect to the first side plate.

A power transmission device according to a thirteenth aspect is the power transmission device according to the twelfth aspect that employs the following configuration. An outer circumferential end portion of the first input plate is disposed on the first axial side with respect to an inner circumferential end portion of the first side plate. An outer diameter of the first input plate is greater than an inner diameter of the first side plate. The first fastening portion is disposed on the first axial side with respect to the first side plate.

According to the present invention, an inertia amount of a flywheel can be increased.

DESCRIPTION OF EMBODIMENTS

Overall Configuration

Figure 1:
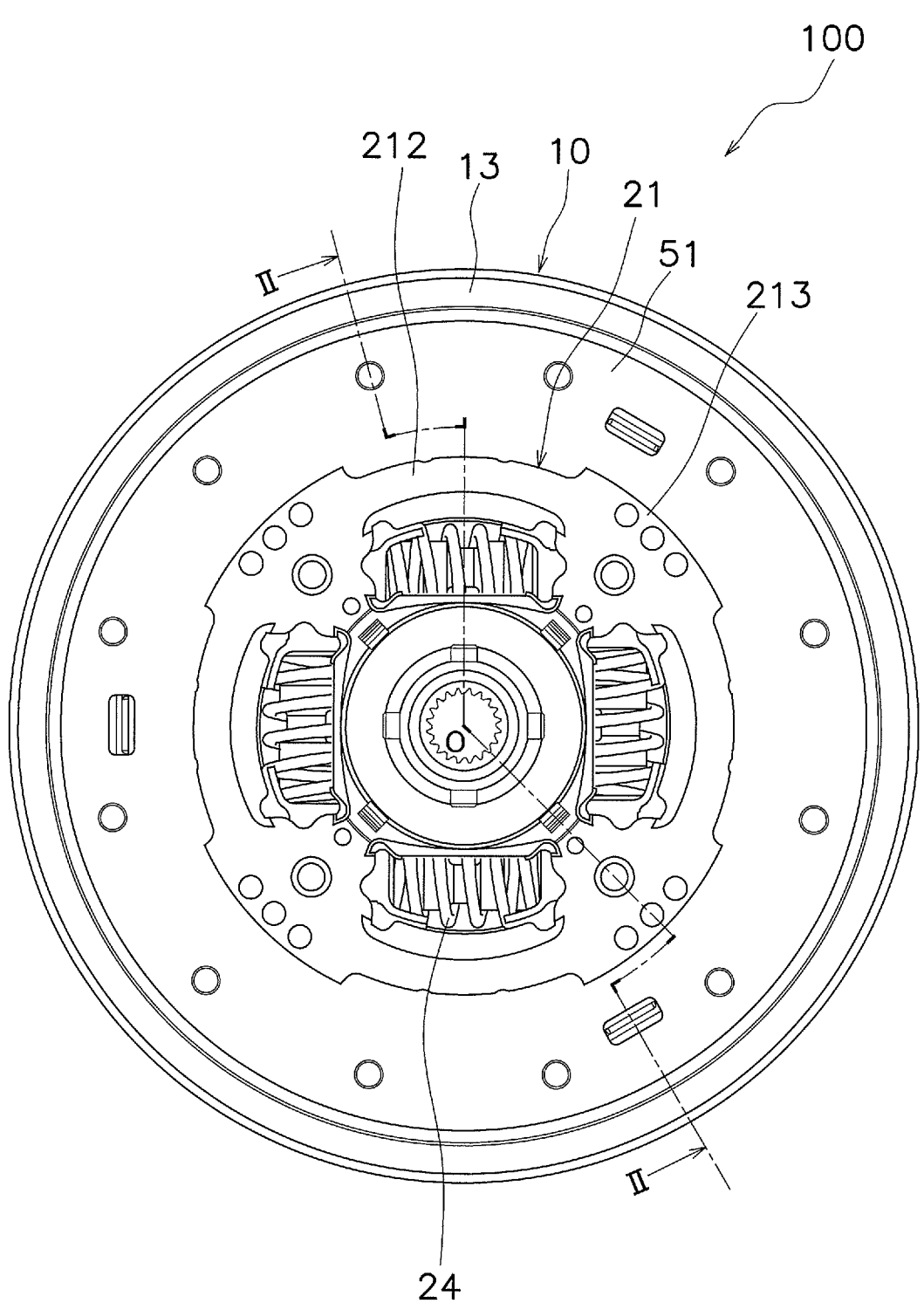
FIG. 1 is a front view of a power transmission device.
Figure 2:
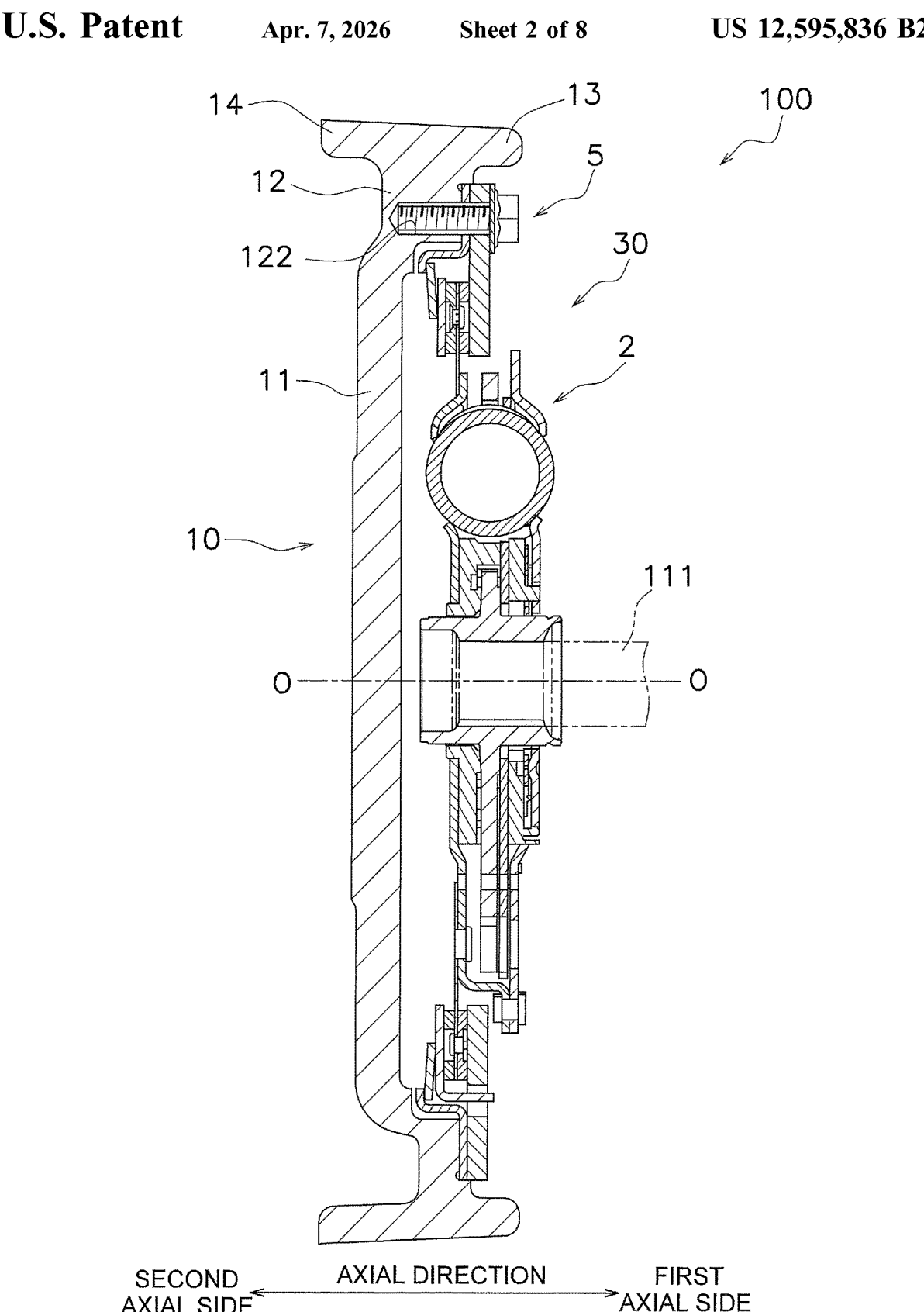
FIG. 2 is a cross-sectional view taken along line II-II in FIG. 1.

FIG. 1 is a front view of a power transmission device 100 according to the present embodiment, and FIG. 2 is a cross-sectional view taken along line II-II in FIG. 1. In FIG. 2, the line O-O is a rotational axis of the power transmission device 100. In FIG. 2, an engine is disposed on the left side with respect to the power transmission device 100, and a drive unit including a motor, a speed shifter, and the like is disposed on the right side with respect to the power transmission device 100.

Note that in the following description, "axial direction" denotes a direction in which the rotational axis O of the power transmission device 100 extends. "First axial side" denotes a side to which a first protruding portion 13 (described later) protrudes, and "second axial side" denotes the opposite side to the first axial side. Specifically, the first axial side refers to the right side in FIG. 2, and the second axial side refers to the left side in FIG. 2. In other words, in the present embodiment, the first axial side means an output side, and the second axial side means an input side. Also, "circumferential direction" denotes a circumferential direction of a circle centered about the rotational axis O, and a radial direction denotes a radial direction of a circle centered about the rotational axis O. Note that the circumferential direction need not necessarily exactly match the circumferential direction of the circle centered about the rotational axis O, and the radial direction need not necessarily exactly match the diameter direction of the circle centered about the rotational axis O.

As shown in FIGS. 1 and 2, the power transmission device 100 includes a flywheel 10 and a damper device 30. Essentially, the flywheel 10 and the damper device 30 rotate together as one piece.

Flywheel

The flywheel 10 is disposed so as to be rotatable around the rotational axis O. The flywheel 10 includes a body portion 11, an attachment portion 12, the first protruding portion 13, and a second protruding portion 14. The body portion 11, the attachment portion 12, the first protruding portion 13, and the second protruding portion 14 are integrally configured as a single member. Note that the body portion 11 may be configured as a separate member from the attachment portion 12, the first protruding portion 13, and the second protruding portion 14. In this case, the body portion 11 can be a flexible plate. The flywheel 10 need not include the second protruding portion 14.

The body portion 11 is formed in a disc-like shape. The attachment portion 12 is disposed radially outward with respect to the body portion 11. The attachment portion 12 has an annular shape that extends in the circumferential direction. The attachment portion 12 protrudes toward the first axial side with respect to the body portion 11.

Figure 3:
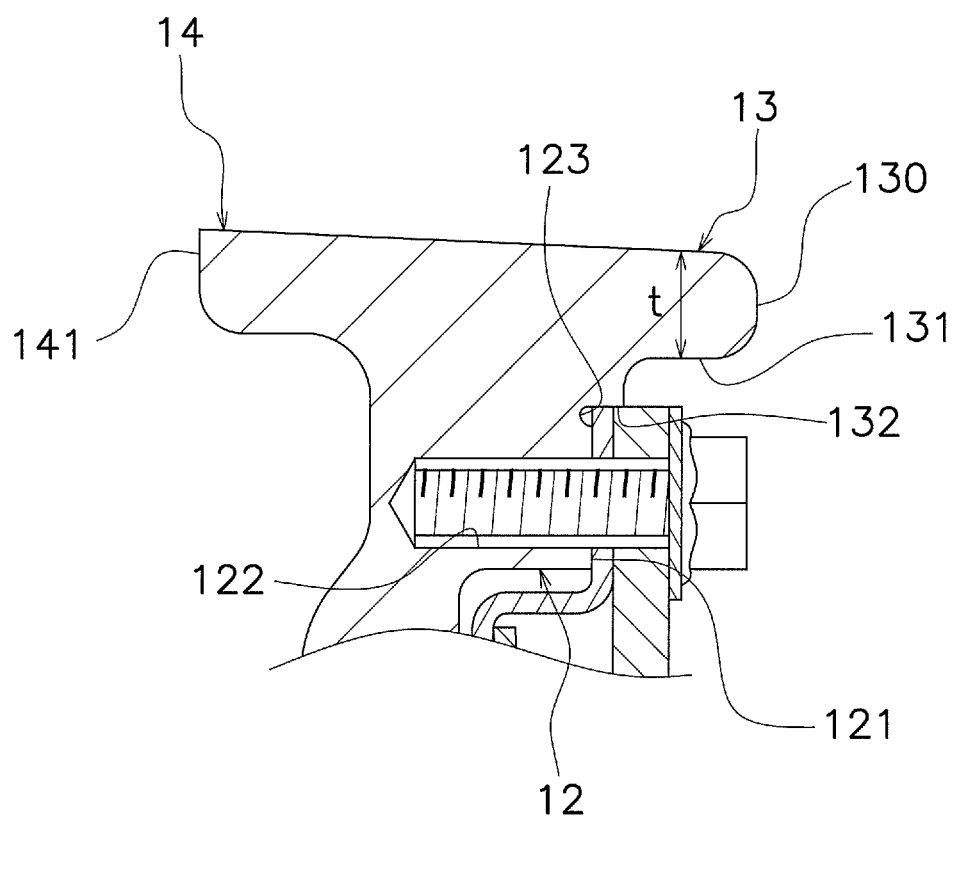
FIG. 3 is an enlarged cross-sectional view of a flywheel.

As shown in FIG. 3, the attachment portion 12 includes an attachment surface 121. The attachment surface 121 faces toward the first axial side. The attachment surface 121 has an annular shape as seen in the axial direction. The attachment portion 12 includes a plurality of screw holes 122 in the attachment surface 121. The plurality of screw holes 122 are arranged in the circumferential direction. The attachment portion 12 also includes a plurality of knock pins (not shown). The plurality of knock pins are arranged in the circumferential direction. The knock pins protrude from the attachment surface 121 toward the first axial side. By inserting the knock pins into knock pin holes formed in an outer circumferential portion of the damper device 30, the damper device 30 is positioned with respect to the flywheel 10.

The attachment portion 12 has a groove portion 123 in an outer circumferential end portion of the attachment surface 121. The groove portion 123 extends in the circumferential direction. The groove portion 123 has an annular shape as seen from the first axial side.

The first protruding portion 13 is disposed radially outward with respect to the attachment portion 12. The first protruding portion 13 has an annular shape extending in the circumferential direction. The first protruding portion 13 protrudes toward the first axial side with respect to the attachment portion 12. In other words, a leading end surface 130 of the first protruding portion 13 is positioned on the first axial side with respect to the attachment surface 121 of the attachment portion 12. Note that the leading end surface 130 of the first protruding portion 13 faces toward the first axial side.

A thickness t of the first protruding portion 13 gradually decreases toward the first axial side. The outer diameter of the first protruding portion 13 gradually decreases toward the first axial side. Note that the outer diameter of the first protruding portion 13 may be constant.

The first protruding portion 13 includes a first inner circumferential surface 131 and a second inner circumferential surface 132. The second inner circumferential surface 132 is disposed on the second axial side with respect to the first inner circumferential surface 131. The inner diameter of the second inner circumferential surface 132 is smaller than that of the first inner circumferential surface 131. The second inner circumferential surface 132 is in contact with the outer circumferential surface of the damper device 30. Note that the first inner circumferential surface 131 is disposed spaced apart from the damper device 30 in the radial direction.

The second protruding portion 14 is disposed radially outward with respect to the attachment portion 12. The second protruding portion 14 is formed with an annular shape extending in the circumferential direction. The second protruding portion 14 protrudes toward the second axial side with respect to the attachment portion 12. In other words, the second protruding portion 14 protrudes toward the opposite side relative to the first protruding portion 13. A leading end surface 141 of the second protruding portion 14 is positioned on the second axial side with respect to the body portion 11. Note that the leading end surface 141 of the second protruding portion 14 faces toward the second axial side.

The outer diameter of the second protruding portion 14 gradually decreases toward the first axial side. Note that the outer diameter of the flywheel 10 gradually decreases toward the first axial side. The inner diameter of the second protruding portion 14 gradually decreases toward the first axial side.

Damper Device

As shown in FIGS. 1 and 2, the damper device 30 is provided between the flywheel 10 and an input shaft 111 of the drive unit. The damper device 30 is configured to restrict torque transmitted between the engine and the drive unit and to attenuate rotational fluctuation.

The damper device 30 is disposed on the first axial side with respect to the flywheel 10. Specifically, the damper device 30 is disposed on the first axial side with respect to the body portion 11.

The damper device 30 is attached to the flywheel 10. Specifically, the outer circumferential end portion of the damper device 30 is attached to the attachment portion 12 of the flywheel 10. The damper device 30 is disposed radially inward with respect to the first protruding portion 13. The damper device 30 includes a damper unit 2 and a torque limiter unit 5.

Torque Limiter Unit 5

The torque limiter unit 5 is configured to be attached to the flywheel 10. Specifically, the outer circumferential portion of the torque limiter unit 5 is attached to the attachment portion 12 of the flywheel 10.

The torque limiter unit 5 is disposed radially outward with respect to the damper unit 2. The torque limiter unit 5 is configured to limit torque transmitted between the flywheel 10 and the damper unit 2. In other words, the torque limiter unit 5 is configured to restrict the transmission of a torque with a predetermined value or more.

Figure 4:
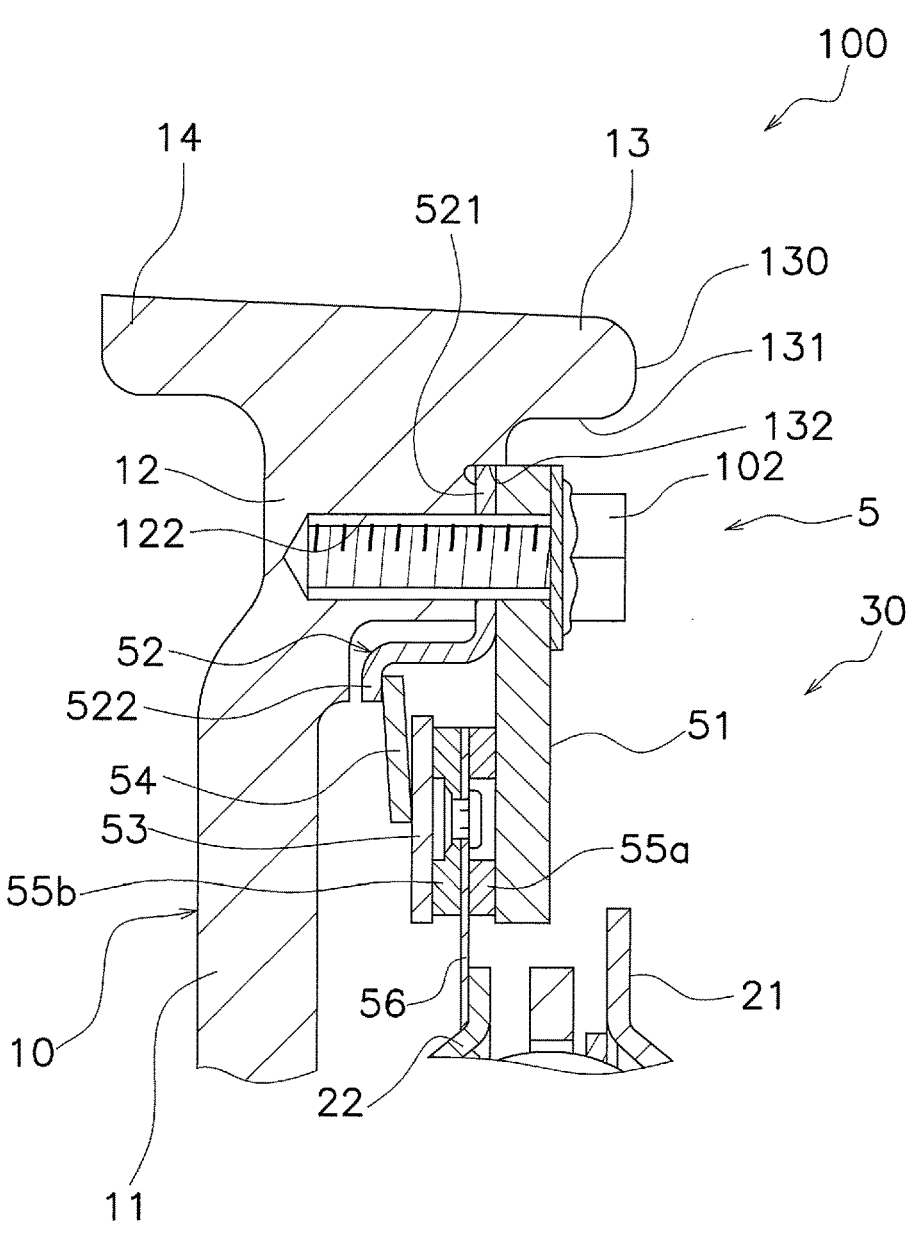
FIG. 4 is an enlarged cross-sectional view of a torque limiter unit.
Figure 4:
Figure 5:
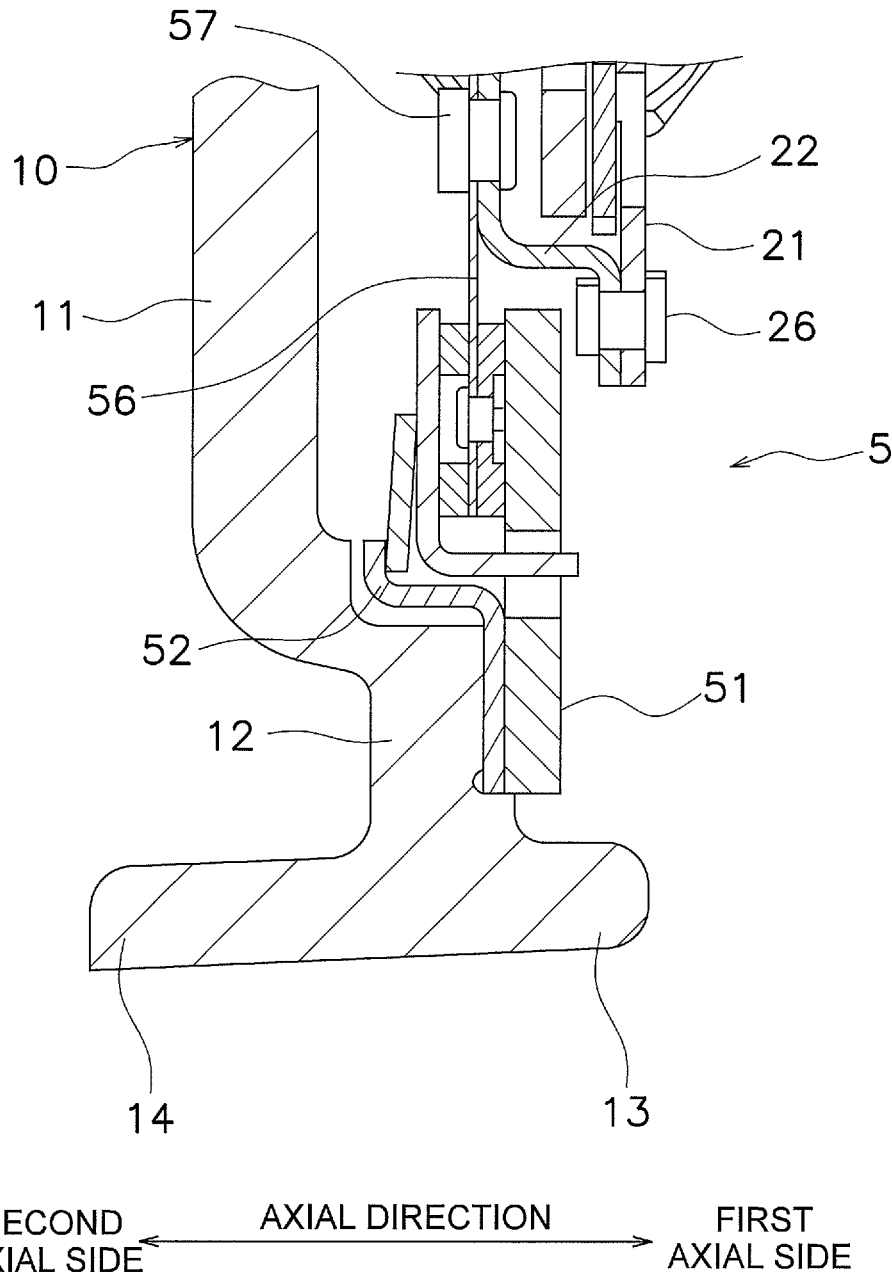
FIG. 5 is an enlarged cross-sectional view of the torque limiter unit.

As shown in FIGS. 4 and 5, the torque limiter unit 5 includes a first side plate 51, a second side plate 52, a pressure plate 53, a cone spring 54, a first friction member 55a, a second friction member 55b, a friction plate 56, and a second fastening portion 57.

First Side Plate

The first side plate 51 has an annular shape. The first side plate 51 is attached to the attachment portion 12 of the flywheel 10. Thus, torque is transmitted to the first side plate 51 from the flywheel 10. Note that an outer circumferential portion of the first side plate 51 is attached to the attachment portion 12. The first side plate 51 is attached to the attachment portion 12 with bolts 102. An inner circumferential surface of the first protruding portion 13 opposes the bolts 102.

An outer circumferential surface of the first side plate 51 opposes the inner circumferential surface of the first protruding portion 13. The outer circumferential surface of the first side plate 51 is in contact with the second inner circumferential surface 132 of the first protruding portion 13. The outer circumferential surface of the first side plate 51 is spaced apart from the first inner circumferential surface 131 of the first protruding portion 13. The leading end surface 130 of the first protruding portion 13 is located on the first axial side with respect to the first side plate 51.

Second Side Plate

The second side plate 52 has an annular shape. The second side plate 52 is disposed on the second axial side with respect to the first side plate 51. The second side plate 52 is attached to the attachment portion 12 of the flywheel 10 together with the first side plate 51. Note that the second side plate 52 may be fixed to the first side plate 51 using rivets (not shown) or the like. In this case, the second side plate 52 need not be attached to the flywheel 10.

An outer circumferential surface of the second side plate 52 opposes the inner circumferential surface of the first protruding portion 13. The outer circumferential surface of the second side plate 52 is in contact with the second inner circumferential surface 132 of the first protruding portion 13. Note that the outer circumferential surface of the second side plate 52 need not be in contact with the second inner circumferential surface 132 of the first protruding portion 13.

The second side plate 52 is disposed spaced apart from the first side plate 51 in the axial direction. Specifically, the second side plate 52 includes an outer circumferential portion 521 and an inner circumferential portion 522. The inner circumferential portion 522 of the second side plate 52 is disposed spaced apart from the first side plate 51 in the axial direction. Note that the outer circumferential portion 521 of the second side plate 52 is in contact with the outer circumferential portion of the first side plate 51. The outer circumferential portion 521 of the second side plate 52 is attached to the attachment portion 12 of the flywheel 10.

The inner diameter of the second side plate 52 is larger than the inner diameter of the first side plate 51. The thickness of the second side plate 52 is smaller than that of the first side plate 51.

Friction Plate

The friction plate 56 has an annular shape. The friction plate 56 is configured to rotate integrally with the first and second input plates 21 and 22. The friction plate 56 is disposed on the second axial side with respect to the second input plate 22. The friction plate 56 is thinner than the second input plate 22. The friction plate 56 is disposed between the first side plate 51 and the second side plate 52 in the axial direction.

Second Fastening Portion

The second fastening portion 57 fastens the friction plate 56 to the damper unit 2. Specifically, the second fastening portion 57 fastens the friction plate 56 to the second input plate 22. Note that the second fastening portion 57 may fasten the friction plate 56 to a first input plate 21. The second fastening portion 57 is disposed radially inward with respect to first fastening portions 26 (described later). Note that the second fastening portion 57 may comprise a rivet, for example.

Friction Members

The first and second friction members 55a and 55b have an annular shape. The first friction member 55a is disposed between the friction plate 56 and the first side plate 51 in the axial direction. The second friction member 55b is disposed between the friction plate 56 and the second side plate 52 in the axial direction. Specifically, the second friction member 55b is disposed between the friction plate 56 and the pressure plate 53 in the axial direction.

The first and second friction members 55a and 55b are attached to the friction plate 56. The first friction member 55a is frictionally engaged with the first side plate 51. The second friction member 55b is frictionally engaged with the pressure plate 53. When torque with a predetermined value or more is input, the first friction member 55a slides against the first side plate 51, and the second friction member 55b slides against the pressure plate 53. As a result of this, the first side plate 51 and the friction plate 56 rotate relative to each other. Note that the first friction member 55a may be fixed to the first side plate 51 and frictionally engaged with the friction plate 56. Also, the second friction member 55b may be fixed to the pressure plate 53 and frictionally engaged with the friction plate 56.

Pressure Plate

The pressure plate 53 has an annular shape. The pressure plate 53 is disposed between the first side plate 51 and the second side plate 52 in the axial direction. Specifically, the pressure plate 53 is disposed between the second friction member 55b and the cone spring 54 in the axial direction.

Cone Spring

The cone spring 54 is disposed between the second side plate 52 and the pressure plate 53 in the axial direction. The cone spring 54 biases the pressure plate 53 toward the first axial side. With this, the pressure plate 53 and the first side plate 51 sandwich the friction plate 56 and the first and second friction members 55a and 55b.

Damper Unit 2

Figure 6:
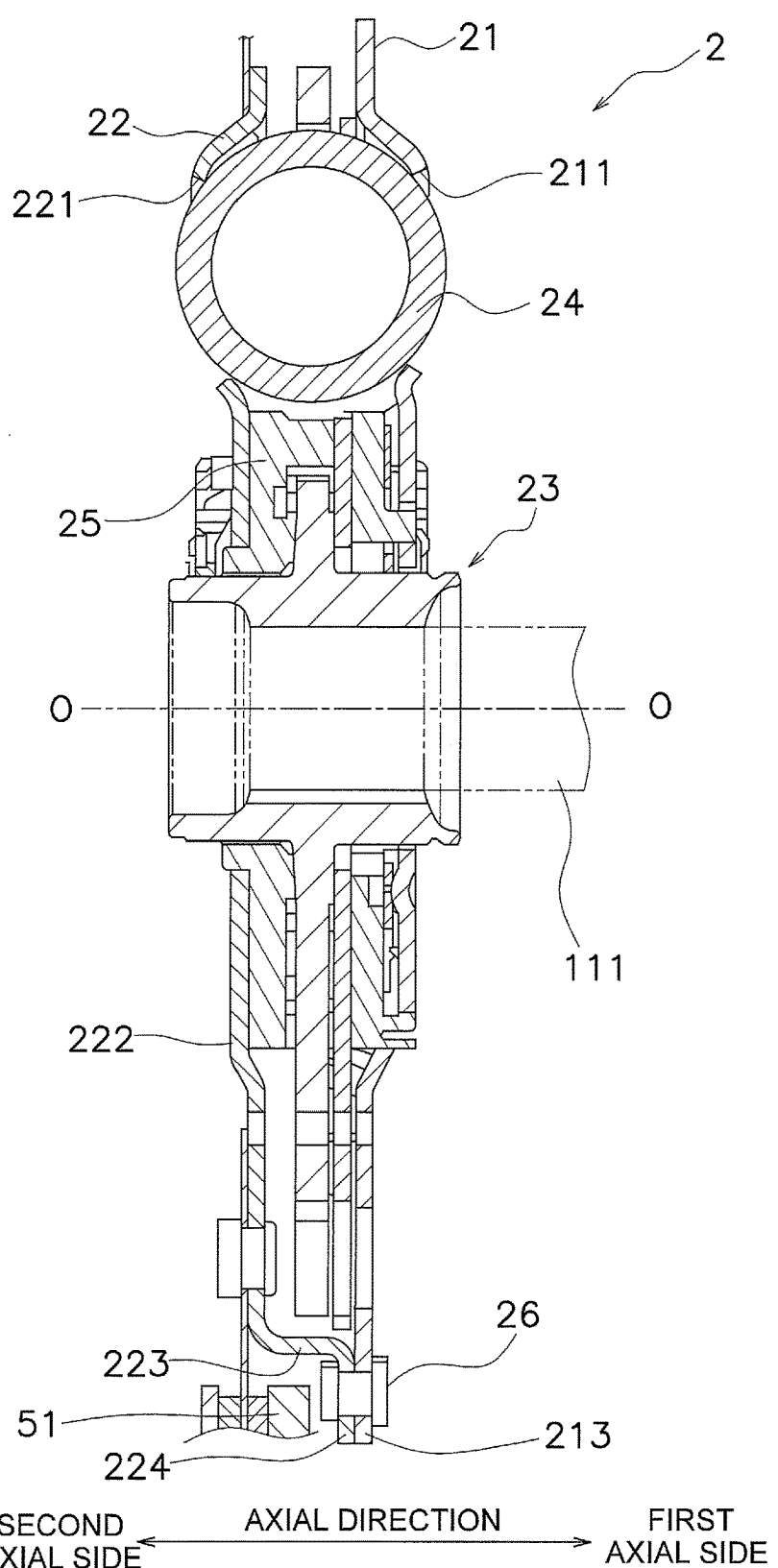
FIG. 6 is a cross-sectional view of a damper unit.

As shown in FIG. 6, the damper unit 2 includes the first input plate 21, the second input plate 22, the spline hub 23, a plurality of elastic members 24, and a plurality of the first fastening portions 26. The damper unit 2 also includes a hysteresis-generating mechanism 25. The damper unit 2 is configured to absorb a torque fluctuation.

First and Second Input Plates

The first input plate 21 and the second input plate 22 are annular-shaped members that each have a central hole. The outer diameter of the first input plate 21 is larger than that of the second input plate 22. Note that the outer diameter of the first input plate 21 may be smaller than or the same as that of the second input plate 22.

The first input plate 21 and the second input plate 22 are disposed axially spaced apart from each other. The second input plate 22 is disposed on the second axial side with respect to the first input plate 21. The first input plate 21 and the second input plate 22 rotate integrally with each other. The first input plate 21 and the second input plate 22 are not capable of moving relative to each other in the axial direction.

The first input plate 21 includes a plurality of first window portions 211. Note that in the present embodiment, the first input plate 21 includes four first window portions 211. The first window portions 211 are arranged in the circumferential direction.

The second input plate 22 includes a plurality of second window portions 221. Note that in the present embodiment, the second input plate 22 includes four second window portions 221. The second window portions 221 are arranged in the circumferential direction. The second window portions 221 are disposed at locations that respectively overlap the first window portions 211 as seen in the axial direction.

As shown in FIG. 1, the first input plate 21 includes a first plate body 212 and a plurality of first attachment portions 213. Note that in the present embodiment, the first input plate 21 includes four first attachment portions 213.

The first plate body 212 has an annular shape. The first attachment portions 213 protrude radially outward from an outer circumferential surface of the first plate body 212. The first attachment portions 213 are disposed spaced apart from each other in the circumferential direction.

An outer circumferential end portion of the first input plate 21 is disposed on the first axial side with respect to an inner circumferential end portion of the first side plate 51. As seen in the axial direction, the outer circumferential end portion of the first input plate 21 overlaps the inner circumferential end portion of the first side plate 51. Note that the outer circumferential end portion of the first input plate 21 means an outer circumferential end portion of the first plate body 212.

The outer diameter of the first input plate 21 is larger than the inner diameter of the first side plate 51. For this reason, as seen from the first axial side, the inner circumferential edge of the first side plate 51 is covered by the first input plate 21 and not seen. Note that the outer diameter of the first input plate 21 means the outer diameter of the first plate body 212.

Figure 7:
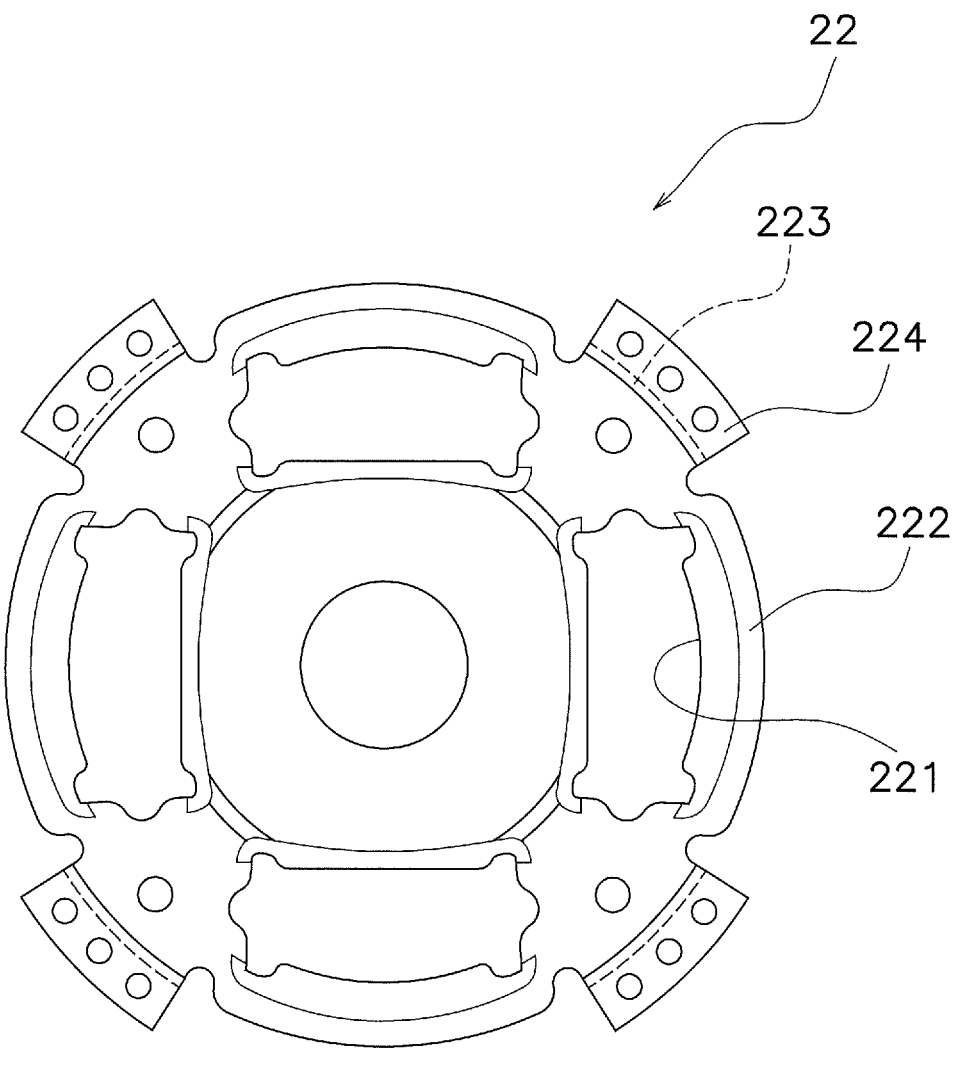
FIG. 7 is a front view of a second input plate.

As shown in FIGS. 6 and 7, the second input plate 22 includes a second plate body 222, a plurality of extended portions 223, and a plurality of second attachment portions 224. Note that, in the present embodiment, the second input plate 22 includes four extended portions 223 and four second attachment portions 224.

The second plate body 222 has an annular shape. The extended portions 223 extend toward the first axial side from the outer circumferential portion of the second plate body 222. The extended portions 223 are disposed spaced apart from each other in the circumferential direction.

The second attachment portions 224 extend radially outward from the extended portions 223. Specifically, the second attachment portions 224 extend radially outward from end portions on the first axial side with respect to the extended portions 223, respectively. The second attachment portions 224 are disposed spaced apart from each other in the circumferential direction.

The outer diameter of the second input plate 22 is smaller than the inner diameter of the first side plate 51. The outer diameter of the second input plate 22 is smaller than the outer diameter of the first input plate 21. Note that the outer diameter of the second input plate 22 may be larger than or the same as the outer diameter of the first input plate 21. Here, the outer diameter of the second input plate 22 means the outer diameter of the second plate body 222.

First Fastening Portion

The first fastening portions 26 fasten the first input plate 21 to the second input plate 22. Specifically, the first fastening portions 26 fasten the first attachment portions 213 of the first input plate 21 to the second attachment portions 224 of the second input plate 22. The first fastening portions 26 may include rivets, for example.

The first fastening portions 26 are disposed on the first axial side with respect to the first side plate 51. Also, the first fastening portions 26 are disposed so as to overlap the first side plate 51 as seen in the axial direction.

Spline Hub 23

Figure 8:
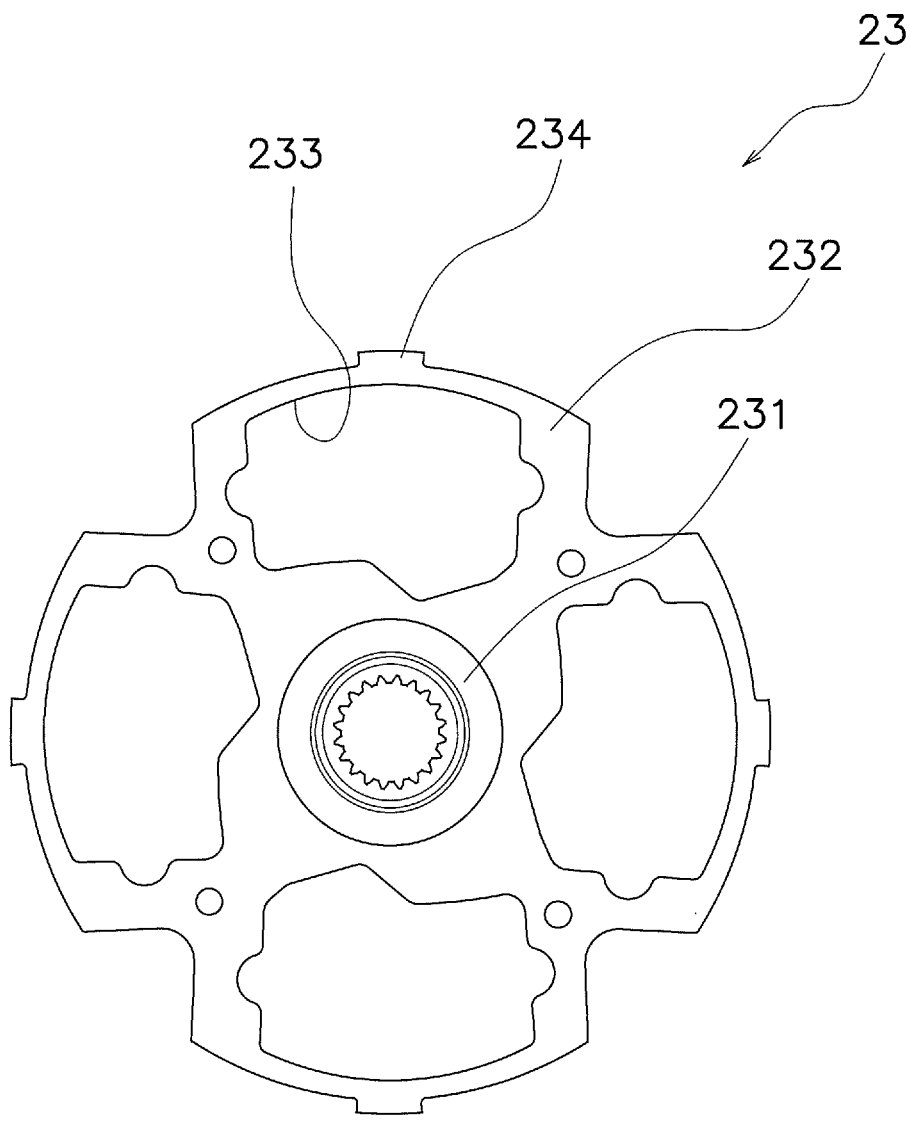
FIG. 8 is a front view of a spline hub.

As shown in FIGS. 6 and 8, the spline hub 23 is configured to transmit torque from the first and second input plates 21 and 22 to a device on the output side. The spline hub 23 includes a boss portion 231, a flange portion 232 (one example of the output plate), and a plurality of housing holes 233. The boss portion 231 and the flange portion 232 are integrally constituted by one member, but the boss portion 231 and the flange portion 232 may be constituted by separate members.

The boss portion 231 has a tubular shape and is disposed in the center holes of the first input plate 21 and the second input plate 22. A spline hole that axially extends is formed in the inner circumferential portion of the boss portion 231. The input shaft 111 that is a member on the output side can be spline-engaged with this spline hole.

The flange portion 232 radially extends from an outer circumferential surface of the boss portion 231. The flange portion 232 has an annular shape. The flange portion 232 is disposed between the first input plate 21 and the second input plate 22 in the axial direction. The flange portion 232 is disposed on the first axial side with respect to the first side plate 51.

The housing holes 233 are formed in the flange portion 232. Note that in the present embodiment, four housing holes 233 are provided. The housing holes 233 are arranged in the circumferential direction. The housing holes 233 are disposed at locations that overlap the first window portions 211 and the second window portions 221 as seen in the axial direction.

The spline hub 23 includes a plurality of stopper portions 234. In the present embodiment, the spline hub 23 includes four stopper portions 234. The stopper portions 234 protrude radially outward from the outer circumferential surface of the flange portion 232. As a result of the stopper portions 234 coming into contact with the extended portions 223 of the second input plate 22, relative rotation of the first and second input plates 21 and 22 with respect to the spline hub 23 is restricted.

Elastic Member

As shown in FIGS. 1 and 6, the elastic members 24 are configured to elastically couple the first and second input plates 21 and 22 to the flange portion 232 in the rotational direction. The elastic members 24 are coil springs, for example.

The elastic members 24 are housed in the housing holes 233 of the flange portion 232. The elastic members 24 are housed in the first window portions 211 of the first input plate 21 and are also housed in the second window portions 221 of the second input plate 22.

Hysteresis-Generating Mechanism

The hysteresis-generating mechanism 25 is configured to generate hysteresis torque when the first and second input plates 21 and 22 and the spline hub 23 rotate relative to each other.

Operation

The torque transmitted from the engine to the flywheel 10 is input to the damper unit 2 via the torque limiter unit 5. In the damper unit 2, the torque is input to the first and second input plates 21 and 22, and transmitted to the spline hub 23 via the elastic members 24. Then, power is transmitted from the spline hub 23 to an electrical motor, a power generator, or a transmission on the output side via the input shaft 111.

In addition, for example, when starting the engine, an excessive torque may be transmitted from the output side to the engine. In such a case, the torque limiter unit 5 restricts the torque transmitted toward the engine to a predetermined value or less.

Variations

The present invention is not limited to the above embodiment. It is possible to make various alterations or modifications without departing from the scope of the present invention. In addition, the following variations may be applied simultaneously.

(a) Although the first protruding portion 13 continuously extends in the circumferential direction in the above embodiment, the shape of the first protruding portion

13 is not limited thereto. For example, the first protruding portion 13 may intermittently extend in the circumferential direction.

(b) Although the attachment portion 12 protrudes toward the first axial side with respect to the body portion 11 in the above embodiment, the configuration of the attachment portion 12 is not limited thereto. In other words, the attachment portion 12 need not protrude toward the first axial side with respect to the body portion 11.

LIST OF REFERENCE NUMERALS

2 Damper unit
21 First input plate
22 Second input plate
24 Elastic member
26 First fastening portion
5 Torque limiter unit
51 First side plate
52 Second side plate
55a First friction member
56 Friction plate
57 Second fastening portion
10 Flywheel
11 Body portion
12 Attachment portion
121 Attachment surface
123 Groove portion
13 First protruding portion
130 Leading end surface
131 First inner circumferential surface
132 Second inner circumferential surface
14 Second protruding portion
30 Damper device
100 Power transmission device

What is claimed is:

1. A power transmission device, comprising:
a flywheel including a body portion, an attachment portion disposed radially outward with respect to the body portion, and a first protruding portion disposed radially outward with respect to the attachment portion, the first protruding portion protruding toward a first axial side with respect to the attachment portion, the attachment portion protruding toward the first axial side with respect to the body portion, the attachment portion being formed as one-piece with the body portion; and
a damper device disposed on the first axial side with respect to the body portion and attached to the attachment portion,
wherein the first protruding portion has an annular shape extending in a circumferential direction, and
wherein the first protruding portion includes a first inner circumferential surface and a second inner circumferential surface disposed on a second axial side with respect to the first inner circumferential surface and having a smaller inner diameter than an inner diameter of the first inner circumferential surface.

2. The power transmission device according to claim 1, wherein an outer diameter of the first protruding portion decreases toward the first axial side.

3. The power transmission device according to claim 1, wherein a thickness of the first protruding portion decreases toward the first axial side.

4. The power transmission device according to claim 1, wherein the flywheel includes a second protruding portion, the second protruding portion disposed radially outward with respect to the attachment portion, the second protruding portion protruding toward the second axial side with respect to the attachment portion.

5. The power transmission device according to claim 1, wherein the damper device includes a damper unit configured to absorb torque fluctuation and a torque limiter unit configured to restrict transmission of torque with a predetermined value or more, and the torque limiter unit is disposed radially outward with respect to the damper unit and is attached to the attachment portion.

6. The power transmission device according to claim 5, wherein the damper unit includes a first input plate;

a second input plate disposed on the second axial side with respect to the first input plate and configured to rotate integrally with the first input plate;

a first fastening portion fastening the first input plate to the second input plate;

an output plate; and an elastic member elastically connecting the output plate to the first and second input plates, and the first fastening portion overlaps the torque limiter unit as seen in the axial direction.

7. A power transmission device, comprising:

a flywheel including a body portion, an attachment portion disposed radially outward with respect to the body portion, and a first protruding portion disposed radially outward with respect to the attachment portion, the first protruding portion protruding toward a first axial side with respect to the attachment portion; and a damper device disposed on the first axial side with respect to the body portion and attached to the attachment portion, wherein the attachment portion includes an attachment surface facing toward the first axial side and a groove portion formed in an outer circumferential end portion of the attachment surface and extending in the circumferential direction.

8. A power transmission device, comprising:

a flywheel including a body portion, an attachment portion disposed radially outward with respect to the body portion, and a first protruding portion disposed radially outward with respect to the attachment portion, the first protruding portion protruding toward a first axial side with respect to the attachment portion; and a damper device disposed on the first axial side with respect to the body portion and attached to the attachment portion, the damper device including a damper unit configured to absorb torque fluctuation and a torque limiter unit configured to restrict transmission of torque with a predetermined value or more, and the torque limiter unit is disposed radially outward with respect to the damper unit and is attached to the attachment portion, wherein the damper unit further includes a first input plate;

a second input plate disposed on the second axial side with respect to the first input plate and configured to rotate integrally with the first input plate;

a first fastening portion fastening the first input plate to the second input plate;

an output plate; and an elastic member elastically connecting the output plate to the first and second input plates, and the first fastening portion overlaps the torque limiter unit as seen in the axial direction, wherein the torque limiter unit includes a friction plate and a second fastening portion fastening the friction plate to the first input plate or to the second input plate, and the second fastening portion is disposed radially inward with respect to the first fastening portion.

9. A power transmission device, comprising:

a flywheel including a body portion, an attachment portion disposed radially outward with respect to the body portion, and a first protruding portion disposed radially outward with respect to the attachment portion, the first protruding portion protruding toward a first axial side with respect to the attachment portion; and a damper device disposed on the first axial side with respect to the body portion and attached to the attachment portion, the damper device including a damper unit configured to absorb torque fluctuation and a torque limiter unit configured to restrict transmission of torque with a predetermined value or more, and the torque limiter unit is disposed radially outward with respect to the damper unit and is attached to the attachment portion, wherein the damper unit further includes a first input plate;

a second input plate disposed on the second axial side with respect to the first input plate and configured to rotate integrally with the first input plate;

a first fastening portion fastening the first input plate to the second input plate;

an output plate; and an elastic member elastically connecting the output plate to the first and second input plates, and the first fastening portion overlaps the torque limiter unit as seen in the axial direction, wherein the torque limiter unit includes a first side plate having an annular shape;

a second side plate having an annular shape, the second side plate disposed on the second axial side with respect to the first side plate;

a friction plate configured to rotate integrally with the first and second input plates; and a first friction member disposed between the friction plate and the first side plate, and a leading end surface of the first protruding portion is located on the first axial side with respect to the first side plate.

10. The power transmission device according to claim 9, wherein an outer circumferential end portion of the first input plate is disposed on the first axial side with respect to an inner circumferential end portion of the first side plate, an outer diameter of the first input plate is greater than an inner diameter of the first side plate, and the first fastening portion is disposed on the first axial side with respect to the first side plate.

\*    \*    \*    \*    \*